Aug. 17, 1965 W. G. BROWN 3,201,777

PULSE CODE MODULATION CODER

Filed June 8, 1962 2 Sheets-Sheet 1

INVENTOR.
WARREN G. BROWN
BY Alfred C. Hill
AGENT

INVENTOR.
WARREN G. BROWN
BY Alfred C. Hill
AGENT

United States Patent Office 3,201,777
Patented Aug. 17, 1965

3,201,777

PULSE CODE MODULATION CODER

Warren G. Brown, River Vale, N.J., assignor to International Telephone and Telegraph Corporation, Nutley, N.J., a corporation of Maryland Filed June 8, 1962, Ser. No. 201,080
20 Claims. (Cl. 340—345)

Figure 1:
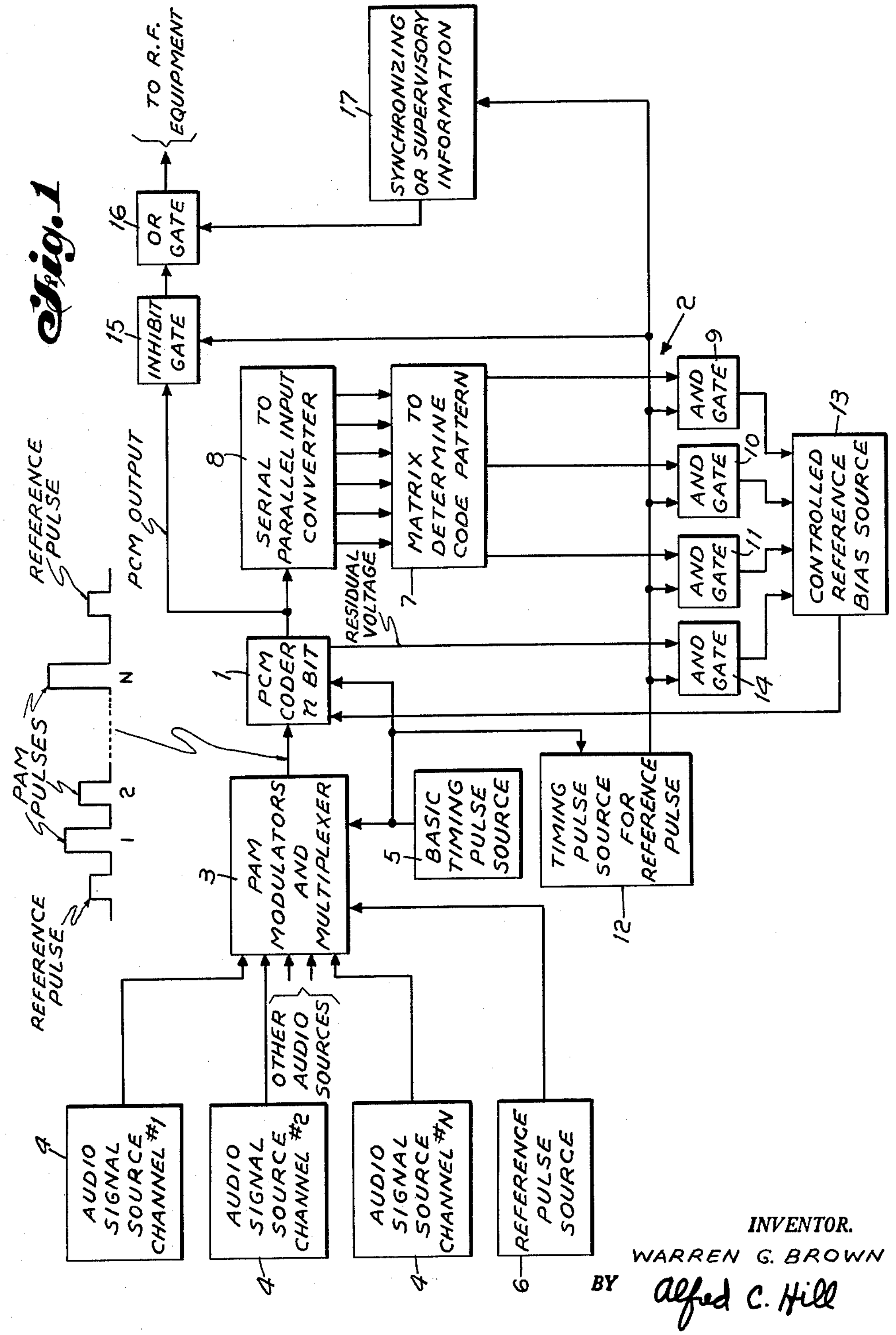

This invention relates to pulse code modulation (PCM) coders and more particularly to an arrangement to stabilize the output signal of PCM coders.

In certain PCM systems it is required that the PCM coder produce a known output code pattern consistently when the information channels, such as audio channels, feeding the coder are not carrying information. Since electronic circuits vary in their characteristics due to age, temperature changes and other such considerations, PCM coders may tend to drift and, thus, actually produce other than the known output code pattern when no information is received. Further, such a drift in the PCM coder would result in errors in the code patterns representing the amplitude of samples of the information.

It has been proposed that the coders themselves could be designed to provide the desired freedom from drift. However, this solution to the problem would require much design time and would more than likely result in a relatively complicated PCM coder which may not suit other than this specific problem and, hence, could not be universally used in other PCM systems.

Therefore, an object of this invention is to provide a relatively simple arrangement to compensate for drift in PCM coders.

Another object of this invention is to provide an arrangement to compensate for drift in a conventional PCM coder.

A further object of this invention is to provide an arrangement to compensate for drift in a PCM coder of the feedback subtraction or loop type.

A feature of this invention is the provision of means to activate a PCM coder during predetermined repetition periods to check on the production of a given code group of pulses representing the absence of information signals and means rendered operative during the checking periods coupled to the coder to ensure production of the given code group of pulses during the absence of information signals.

Another feature of this invention is the provision of a PCM coder generating a code group of pulses representing each discrete amplitude level and a residual voltage representing the difference between the generated code group of pulses and the actual amplitude of the input signal. Along with the intelligence input to the coder is supplied periodically a pulse having an amplitude corresponding to a given one of the amplitude levels representing the rest condition for the coder. A bias source, such as a capacitor, is coupled to the coder which will maintain the coder in a condition to generate the predetermined code group of pulses representing the rest amplitude condition for the coder during the recurring pulse. Logic circuit is employed to provide a coarse correction voltage indicating whether the generated code during the recurring pulse is above or below the desired amplitude level by examining the pulses of the code group of pulses generated during the recurring pulse period and a fine correction voltage in response to the residual voltage and a direct current reference voltage. Both the coarse and fine correction voltages are coupled to the bias source to correct the reference bias to compensate for any drift in the operation of the coder.

Still another feature of this invention is the provision of means at the output of the coder to remove the code group of pulses generated by the injected reference pulse and substitute therefor other information, such as synchronizing or supervisory information.

Figure 2:
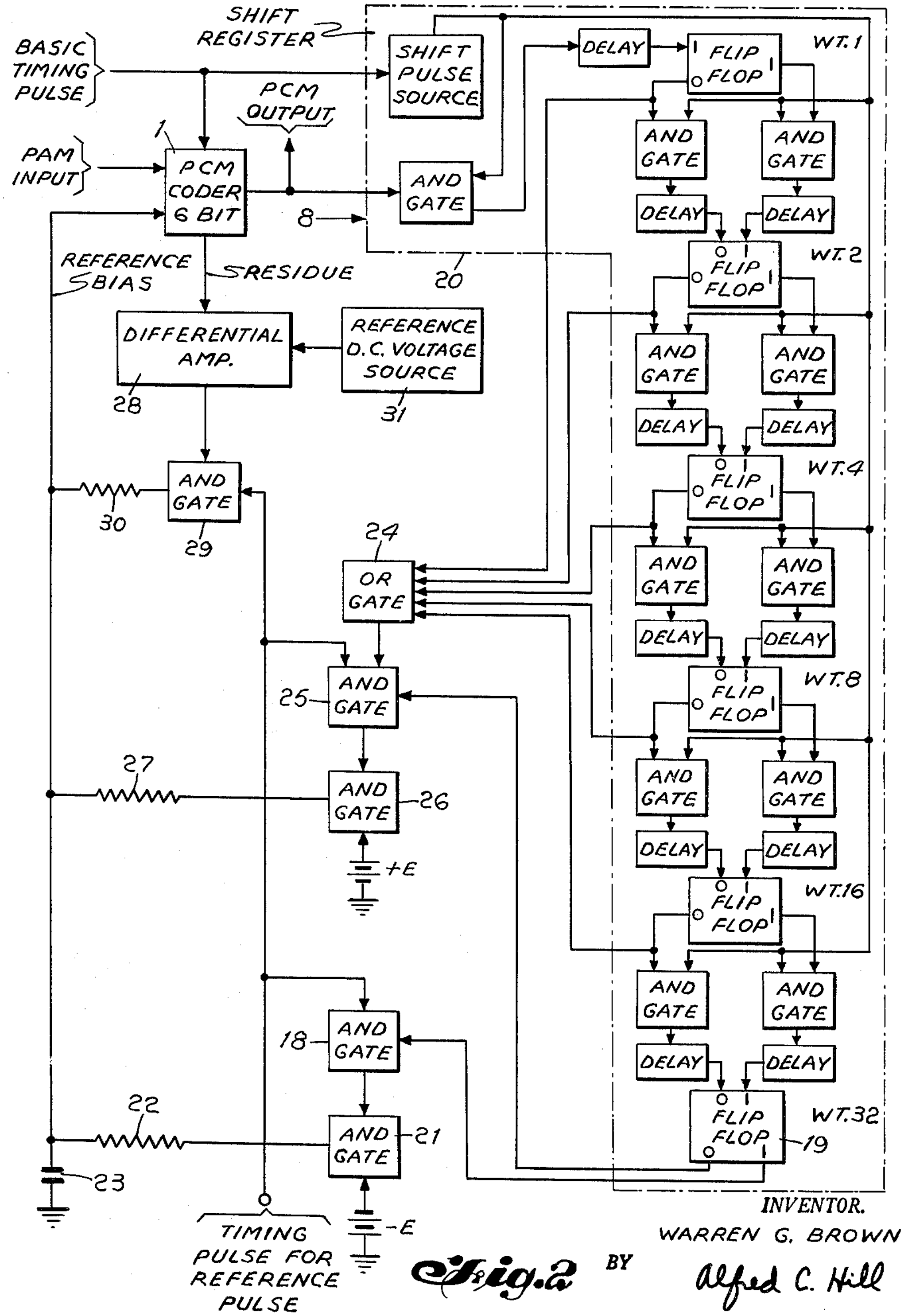

The above-mentioned and other features and objects of this invention will become more apparent by reference to the following description taken in conjunction with the accompanying drawings in which:

FIG. 1 is a schematic diagram in block form of a PCM transmitting terminal incorporating one embodiment of the stabilizing arrangement of this invention; and FIG. 2 is a schematic diagram in block form of another embodiment of the stabilizing arrangement of this invention.

Referring to FIG. 1, the stabilizing arrangement of this invention is illustrated as including PCM coder 1 which is required to produce a predetermined code group of pulses in the absence of information signals. Coder 1 is activated during predetermined repetitious periods to check the production of the given code group of pulses and means 2 rendered operative during the checking periods ensures the production of the given code group of pulses during the absence of information signals.

More specifically, coder 1 is shown to be activated from a pulse amplitude modulation (PAM) multiplexer 3 which includes therein PAM modulators responding sequentially to a plurality of audio signal sources 4 in accordance with the timing dictated by the basic timing source 5. In addition to sources 4 is a source 6 supplying reference pulses having an amplitude of sufficient magnitude to cause coder 1 to produce a given code group of pulses representing a given one of the amplitude levels of the plurality of quantized amplitude levels to which coder 1 responds. Thus, the output from multiplexer 3 is a pulse train including a plurality of PAM information signals and a reference amplitude pulse.

Coder 1 incorporated in the arrangement of this invention must furnish at the output thereof a plurality of bits, for instance, $n$ bits, which correspond to one of the plurality of quantized amplitude levels and a residual voltage which represents the difference between the quantized amplitude level represented by the code group of pulses and the actual amplitude of the input pulse. This residual voltage is the voltage that would control the generation of bits $n+1$ and $n+2$, etc., if the coder were allowed to generate a more detailed output signal. Such a residual voltage exists in either feedback subtraction type or loop type coders. This residual voltage is required in order to correct for drift before the effect thereof is felt as a shift in the output codes.

The residual voltage varies cyclically as a function of input voltage and, thus, tells nothing about the code pattern of the output code group of pulses. In order to determine the code pattern, matrix 7 is employed. Matrix 7 will be a relatively simple matrix when the output signals are in parallel. Thus, the serial output of coder 1 is converted to parallel form in serial to parallel input converter 8. Converter 8 may be in the form of a delay line or the equivalent circuit to provide the parallel fed to matrix 7. Matrix 7 will produce output signals indicating the pattern of the code group of pulses as the coder generates these code groups. To carry out the objects of this invention, it is only necessary to utilize the code pattern information produced when coder 1 is activated by the reference pulse. Thus, the code pattern information from matrix 7 is coupled to AND gates 9, 10, and 11 which in turn are activated by the timing pulse of source 12 during the period of the reference pulse. Matrix 7 can be arranged to provide an indication of the proper code pattern and couple this indication through gate 9 to bias source 13 which operates to bias coder 1 to produce the given code group of pulses when no information is coupled from any of the sources 4. If due to drift, coder 1 produces an output code group pulse representing an amplitude greater than the reference amplitude, matrix 7 would detect this and supply the correcting potential through gate 10 to source 13 to reduce the bias. On the other hand, if the reference pulse causes coder 1 to produce a code group of pulses representing an amplitude less than the desired amplitude, matrix 7 would detect this situation and gate 11 would supply the proper correcting voltage to adjust the bias of source 13. Thus, the action of matrix 7 is to provide a coarse indication of whether the code group of pulses generated during the reference pulse is correct, above or below the correct value and accordingly cause a coarse correction of the bias voltage output of source 13.

The employment of AND gate 14 responding to the residual voltage could provide under proper conditions a vernier control to finely adjust the bias of source 13 to the proper amount to thereby compensate accurately for drift in coder 1.

Since the reference pulse was injected into coder 1 and is employed only at the transmission end of the PCM system, and due to the manner of injecting this reference pulse to occupy a portion of the usable bandwidth of the system, provisions are included to remove the code group of pulses representing this reference pulse and substituting therefor synchronizing or supervisory information as the case may be, for transmission to a remote point. This is accomplished by employing inhibit gate 15 to block the passage of the code group of pulses representing the amplitude of the reference pulse during the time space of the reference pulse. Thus, pulses from source 12 cause gate 15 to block or inhibit the passage of the code pulse group representing the reference pulse. OR gate 16 permits the passage of the output of gate 15 which has a blank time slot due to the removal of the code group of pulses representing the reference signal. This blank time slot can be occupied by information from surce 17, in the form of synchronizing signals or supervisory signals, timed for application to gate 16 by timing signal of source 12. The output signal of gate 16 is coupled to succeeding circuitry, such as radio frequency transmitting equipment.

Referring to FIG. 2, components employed in conjunction with a six bit PCM coder are illustrated and will be employed to describe in greater detail the operation of compensating for drift in the coder. Since coder 1 employs a six bit code group of pulses, it is possible for coder 1 to produce binary numbers corresponding to decimals zero to sixty-three, these decimal values indicating the quantized amplitude levels of coder 1. Thus, coder 1 can produce a different code group of pulses for 64 different quantized amplitude levels. Level thirty-one is approximately midway along the scale zero to sixty-three and is a convenient level at which to stabilize coder 1. Levels thirty-two to sixty-three have a "1" as their most significant bit. Therefore, anytime, a "1" appears as the most significant bit of the code group of pulses generated during the reference pulse coder 1 has drifted upward. To indicate this condition AND gate 18 is coupled to the "1" output of flip-flop 19 contained in converter 8 illustrated as a shift register 20. Gate 18 is primed by the timing pulse for the reference pulse so that when an output appears on the "1" output of flip-flop 19, gate 18 will produce an output opening a switch, illustrated as AND gate 21, permitting the coupling of voltage −E through gate 21 for the duration of the timing pulse. Resistor 22 and voltage −E are proportioned so that the charge on capacitor 23 is reduced approximately enough to bring the next code group of pulses generated during the next reference pulse duration and all other outputs down one level.

The polarities assumed herein are for convenience in explanation although actual circuits may use either polarity provided that the corrections reduce the drift rather than increase it. The exact magnitude of correction is not critical as long as the negative feedback loop is stabilized and has sufficient gain. The choice of a single level correction jump is based on the fact that this is the most probable magnitude and can be corrected most rapidly if the size of the required correction is accurately predicted. Too large a correction leads to overshoots and an oscillatory response to disturbances, while too small a correction leads to a sluggish response.

OR gate 24 is coupled to the "0" output of the other flip-flop of shift register 20 and will provide an output unless the code group of pulses representing level thirty-one or sixty-three is stored in the flip-flops of shift register 20. This is true because at these code levels there are no zeros in digits two to six. All the other levels of the code pattern have at least one zero in digits two to six.

AND gate 25 is coupled to the "0" output of flip-flop 19 and, thus, gate 25 will provide an output when coder 1 produces code pulse groups representing the amplitude levels from zero to thirty, inclusive, during the occurrence of the reference pulse provided, of course, there is an output from gate 24. Under these conditions, a correction is made by turning on a switch, such as AND gate 26, for a time equal to the width of the timing pulse for the reference pulse to permit the passage of +E through resistor 27 to provide enough charge for capacitor 23 and, hence, correct the reference bias generated by capacitor 23, enough to produce a one level increase in all outputs of coder 1.

A third control path to capacitor 23 is from the differential amplifier 28 through the switch in the form of AND gate 29 and resistor 30. While gates 18 and 25 operate to make initial or coarse corrections or correct major disturbances, they do not contribute to the normal bias regulating action. The amplified difference between the residual voltage at the output of coder 1 and the D.C. voltage of source 31 is gated through gate 29 and resistor 30 to capacitor 23 during every reference pulse. This voltage tells how well coder 1 is stabilized. When there is good stability in coder 1 or, in other words, when there is a good margin for drift in either direction without losing the correct reference level code group of pulses, the current through resistor 30 will be negligible. As coder 1 drifts toward level thirty-two there will be increasingly larger pulses through resistor 30 with the same polarity as present in resistor 22. Conversely, as coder 1 drifts toward level thirty there will be increasingly larger pulses through resistor 30 which match the polarity of the current pulses through resistor 27.

The use of a single large capacitor 23 to provide and stabilize the bias permits small step increments of voltage with negligible changes between steps. The leakage through the three switches, gates 21, 26, and 29 and the current drain of coder 1 must be low enough to permit this long time constant. The step type of transient response is ideal for the reference bias as it is adjusted to the best predicted value at the end of the reference pulse and stays at that value without oscillation during the entire following frame.

It should be noted that hunting in this control arrangement can appear as noise on every channel in the output and further that in this particular coarse and fine control system, the fine control is able to aid the coarse control rather than requiring an inhibiting action as in the case of two-speed synchro controls. This can be seen by taking some examples. Suppose that during the time of the reference pulse level thirty-two is generated and the residual voltage indicates that coder 1 is near level thirty-three. The coarse adjustment provided by gates 18 and 21 will reduce the bias to a value such that on the next reference pulse two conditions could be present. First, level thirty-one is generated but with the residual voltage indicating that coder 1 is near level thirty-two. Second, level thirty-two is generated but with the residual voltage indicating that coder 1 is relatively close to level thirty-one. For the first condition, the fine control, as produced by differential amplifier 28 and gate 29, adds to the single level drop of the coarse control to give a drop of up to 1½ levels so that from level thirty-two near level thirty-three the control arrangement could drop on one sample to the middle of the level thirty-one range. For the second condition, there is still an error in the code group of pulses generated and the coarse correction alone might overshoot level thirty-one and give level thirty for the next sample. The fine control bucks part of this one level drop to produce as little as one half level drop, the ideal correction for this situation.

The circuit arrangement described hereinabove to stabilize coder 1 has placed an emphasis on speedy correction of drifts, since 100 or more bits of channel capacity could be lost during every frame where the bias is incorrectly adjusted and, of course, hunting of the coarse control would be disastrous.

The examples employed hereinabove and the circuits described have been employed for purposes of explanation and it is obvious that a number of variations can be made in the logic circuit utilized by employing Boolean algebra or other methods without changing the principle of control. For instance, it will be noted that in the arrangement of FIG. 1 the coarse adjustments indicated correct level, too high, or too low. The basic principles employed in FIG. 1 were modified with an accompanying simplicity of the logic circuit as indicated in FIG. 2 by eliminating the correct level indication of FIG. 1. There are many other variations employing the principles of this invention which one skilled in the art could devise.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement to stabilize the output signal of pulse code modulation coders comprising:
a pulse modulation coder producing a given code group of pulses during the absence of information signals;
means coupled to said coder to activate said coder during predetermined repetitious periods to check the production of said given code group of pulses; and
means rendered operative during said checking periods coupled to said coder to ensure the production of said given code group of pulses during the absence of information signals.

2. An arrangement according to claim 1, wherein said means rendered operative includes:
logic circuitry coupled to the output of said coder producing a control signal indicative of the accuracy with which said coder produces said given code group of pulses.

3. An arrangement according to claim 2, wherein:
said coder generates a residual voltage proportioned to the difference between the actual amplitude of an input pulse and the amplitude represented by the produced code group of pulses; and
said logic circuitry responds to both said residual voltage and the produced code group of pulses.

4. An arrangement according to claim 1, wherein said means to activate includes:
a source of pulses having a given constant amplitude to cause said coder to produce said given code group of pulses.

5. An arrangement according to claim 4, wherein said means rendered operative includes:
logic circuitry coupled to the output of said coder producing a control signal proportional to the difference between said constant amplitude and the code group of pulses produced by said coder.

6. An arrangement according to claim 5, wherein:

said coder generates a residual voltage proportional to the difference between the actual amplitude of an input pulse and the amplitude represented by the produced code group of pulses; and
said logic circuitry responds to both said residual voltage and the produced code group of pulses.

7. An arrangement to stabilize the output signal of pulse code modulation coders comprising:
a pulse modulation coder producing a given code group of pulses during the absence of information signals;
means coupled to said coder to activate said coder during predetermined repetitious periods to check the production of said given code group of pulses; and
means rendered operative during said checking periods coupled to said coder to detect and compensate for any drift in the output of said coder relative to said given code group of pulses.

8. An arrangement according to claim 7, wherein said means to activate includes:
a source of pulses having a given constant amplitude to cause said coder to produce said given code group of pulses.

9. An arrangement according to claim 7, wherein said means rendered operative includes:
logic circuitry to detect said drift and to produce a control voltage having the appropriate magnitude and polarity to compensate for said drift.

10. An arrangement to stabilize the output signal of pulse code modulation coders comprising:
a pulse modulation coder;
a source of voltage coupled to said coder to bias said coder to produce a given code group of pulses representing a given discrete amplitude level during the absence of information signals;
means to periodically inject a reference pulse having an amplitude equal to said given amplitude level into said coder;
means coupled to the output of said coder to produce a control signal during the occurrence of said reference pulse proportional to the difference between the amplitude of said reference pulse and the code group of pulses generated by said coder; and
means to couple said control signal to said source of voltage to adjust the value of said voltage to ensure said coder generates said given code group of pulses during the absence of information signals.

11. An arrangement according to claim 10, further including:
a source of information; and
means coupled to the output of said coder and said source of information to remove the code group of pulses produced as the result of said reference pulse and substitute therefor said information.

12. An arrangement according to claim 10, wherein said source of voltage includes:
a capacitor; and
said control signal controls the charge of said capacitor to adjust said voltage.

13. An arrangement according to claim 10, wherein said means to produce a control signal includes:
a plurality of gate circuits responsive to the code groups of pulses generated by said coder.

14. An arrangement according to claim 13, wherein:
at least one of said gate circuits responds to the most significant weight pulse of the code groups of pulses.

15. An arrangement according to claim 13, wherein said gate circuits include:
a first gate responsive to all pulses of the code groups of pulses except the most significant weight pulse;
a second gate responsive to the output signal of said first gate and the most significant weight pulse of the code group of pulses; and
a third gate responsive to the most significant weight pulse of the code group of pulses.

16. An arrangement to stabilize the output signal of pulse code modulation coders comprising:

a coder to generate a different code group of pulses representing each of a given number of discrete amplitude levels and a residual voltage representing the difference between the generated code group of pulses representing a given one of said amplitude levels and the amplitude of the input signal;

a source of input signals coupled to said coder including at least one pulse amplitude modulated in accordance with intelligence and a periodically recurring pulse having an amplitude corresponding to a given one of said amplitude levels;

a source of bias coupled to said coder to maintain said coder in a condition to generate a predetermined code group of pulses representing said given one of said amplitude levels during said recurring pulse;

means coupled to said coder to produce a control signal during said recurring pulse proportional to the difference between the amplitude of said recurring pulse and the code group of pulses generated by said coder; and means coupling said control signal to said source of bias to adjust the amplitude of said bias to cause said coder to produce said predetermined code group of pulses during the occurrence of said recurring pulse.

17. An arrangement according to claim 16, wherein said source of bias includes:

a capacitor.

18. An arrangement according to claim 17, wherein said means to produce includes:

a source of direct current reference voltage; and a gate circuit coupled to said source of reference voltage and to said coder responsive to said residual voltage, the output signal of said gate circuit controlling the charge of said capacitor to adjust said bias.

19. An arrangement according to claim 17, wherein said means to produce includes:

a first gate circuit responsive to all pulses of the code groups of pulses except the most significant weight pulse;

a second gate circuit responsive to the output of said first gate circuit and the most significant weight pulse of the code group of pulses; and a third gate circuit responsive to the most significant weight pulse of the code group of pulses;

the output signal of said second and third gate controlling the charge of said capacitor to adjust said bias.

20. An arrangement according to claim 17, wherein said means to produce includes:

a first gate circuit responsive to all pulses of the code groups of pulses except the most significant weight pulse;

a second gate circuit responsive to the output of said first gate circuit and the most significant weight pulse of the code group of pulses;

a third gate circuit responsive to the most significant weight pulse of the code group of pulses;

a source of direct current reference voltage;

a fourth gate circuit coupled to said source of reference voltage and the output of said coder responsive to said residual voltage;

the output signal of said second, third and fourth gate circuits constituting said control signal to control the charge of said capacitor to adjust said bias.

References Cited by the Examiner

UNITED STATES PATENTS

| | | | |
|---|---|---|---|
| 2,610,295 | 9/52 | Carbrey | 332—11 |
| 2,832,827 | 4/58 | Metzger | 332—11 |
| 3,051,901 | 8/62 | Yaeger | 179—15 |
| 3,065,422 | 11/62 | Villars | 325—141 |

NEIL C. READ, *Primary Examiner.*